United States Patent [19]
Brennan

[11] Patent Number: 5,810,203
[45] Date of Patent: Sep. 22, 1998

[54] PRESSURE DISPENSING PUMP

[75] Inventor: James Brennan, Chippendale, Australia

[73] Assignee: Novapharm Research Pty. Limited, Rosebery, Australia

[21] Appl. No.: 232,122

[22] PCT Filed: Nov. 4, 1992

[86] PCT No.: PCT/AU92/00593

§ 371 Date: May 2, 1994

§ 102(e) Date: May 2, 1994

[87] PCT Pub. No.: WO93/09408

PCT Pub. Date: May 13, 1993

[30] Foreign Application Priority Data

Nov. 8, 1991 [AU] Australia .................. PK9404

[51] Int. Cl.$^6$ .................................................. B65D 37/00
[52] U.S. Cl. ........................ 222/207; 222/209; 222/494
[58] Field of Search .................... 222/207, 209, 222/494, 212, 213; 137/852; 417/479

[56] References Cited

U.S. PATENT DOCUMENTS

| | | | |
|---|---|---|---|
| 2,143,661 | 1/1939 | Schrader | 222/207 |
| 2,772,817 | 12/1956 | Jauch | 222/207 |
| 3,178,072 | 4/1965 | Pickels | 222/207 |
| 4,478,356 | 10/1984 | Roggenburg, Jr. et al. | 222/207 |
| 4,903,867 | 2/1990 | Mettenbrink | 222/207 |
| 5,099,885 | 3/1992 | Nilsson | 222/494 |

FOREIGN PATENT DOCUMENTS

| | | | |
|---|---|---|---|
| 9414675 | 7/1994 | WIPO | 222/207 |

*Primary Examiner*—Philippe Derakshani
*Attorney, Agent, or Firm*—Reising, Ethington, Learman & McCulloch, PLLC

[57] ABSTRACT

A pressure responsive dispensing pump has a hollow housing having walls forming a chamber coupled via an inlet to a supply of dispensable material. An inlet valve controls the flow of the material through the inlet into the chamber. The housing also has an outlet through which material may be discharged from the chamber under the control of a self-sealing outlet valve. At least one wall of the housing is displaceable inwardly of the chamber to reduce the volume thereof and force material out of the chamber via the outlet. The displaceable wall is connected to a flexible hinge which also moves inwardly of the chamber in response to the inward movement of the displaceable wall and thereby assists in discharging the contents of the chamber.

10 Claims, 6 Drawing Sheets

PRESSURE DISPENSING PUMP

This invention relates to pressure dispensing pumps and more particularly to those pressure dispensing pumps which are capable of dispensing a predetermined amount of a fluent mass whether that mass be liquid, semi liquid, semi solid or of a gel or paste like substance.

PRIOR ART

The prior art to these types of dispensers will now be described.

U.S. Pat. 3,361,305

This patent relates to fluid dispensers and incorporates a series of one way valves and a ball outlet valve as well as a diaphragm pump arrangement. There is considerable multiplicity of parts requiring the assembly of an inlet valve into the inner wall then assembly of the ball into outlet valve at final assembly of the diaphragm onto container wall. Such devices as illustrated in U.S. Pat. No. 3,361,305 require considerable time in assembly and manufacture. The diaphragm is such that a predetermined amount of fluid cannot be dispensed accurately. Further, when placed in an "upside down" orientation, the valve arrangement is such that leakage of a low viscosity fluid would occur via outlet and ball.

U.S. Pat. No. 3,910,467

This patent relates to a dispensing device for dispensing a fluid and utilises a diaphragm which is adapted to be pushed to permit the fluid to flow and a second diaphragm to serve as a sealing device. This patent relates not so much to a pump action type arrangement, but rather is a sophisticated valve arrangement to allow a metered dose to exit through an opening. Pressure is applied to the contents of the package by squeezing or exerting pressure upon the actual tube, which forces the funnel portion to move away from a valve or spindle element whilst simultaneously forcing the diaphragm down onto the top of spindle thereby sealing the aperture. In this way a selected amount of fluid will pass out of the aperture. The construction is such that it requires two diaphragms and spindle to be assembled in the container. The pump or pressure action comes from applying pressure to the outside of the container rather than to the dispensing head.

DE 2842073

This relates to a dispensing head for an atomiser and requires a multiplicity of parts including a pressure chamber arrangement, ball valve, variety of spring means and is designed to firstly action the pump and provide a fluid inside a chamber under pressure which is then released by the pushing of a spraying nozzle which opens a further valve permitting the contents to be sprayed, presumably as a fine mist. This would not be suitable for more viscous fluids and clearly involves a very large number of parts all requiring considerable assembly time.

U.S. Pat. No. 2.414.963

This patent relates to an arrangement comprising a two chamber dispensing package, a supply chamber and a discharge chamber. However, like U.S. Pat. No. 3,910,467, it requires a pressure to be applied to the container itself in order to discharge fluid from the container. In another embodiment, the dispensing chamber is closed by means of pushing of the finger against a wall of the container, the wall of the container performing the sealing. With continued pressure the pressure applied to the contents in the discharge chamber forces the contents out of the valve. Even though upon release of finger pressure the contents of the package flow into the discharge chamber, the action of pushing the wall to close the valve will force contents away from the valve opening thus reducing the ability of a system to work effectively.

U.S. Pat. No. 3,820,689

This relates to a pump having a substantially hemispherical pressure chamber and Includes an outlet which will expose any contents contained therein to contaminants. The hemispherical pressure chamber provides no mechanical advantage and has a slower recovery rate. Further, due to its shape, the "stroke" of the pumping action produces a small vacuum, thus requiring many pumping strokes.

The arrangement of these pumps also leads to a situation most conductive to the contents proceeding back into the storage unit, due to gravity feed. This ultimately means that the pump will need to be primed after being left idle for some time.

DE 3101020

This relates to a pump-type dispensing device, but utilises a pressure chamber and a valve and forces the fluids to snake along a tortuous path to enter into the pressure chamber and then out via another valve means for dispensing. The multiplicity of parts involved in this dispensing device is such that assembly time is comparatively high with greater chance for failure due to the intricate nature of the system.

DE 3236552

This relates to a pump action type device including a concertina type pressure chamber which is designed to draw contained fluid therein and then subsequently by removal of a cap portion, poured out. In this way a measured portion is poured out after a pump action draws the fluid from the bottom of the jar or container.

U.S. Pat. No. 4,564,130

This relates to a dispenser for paste like products comprising a pump diaphragm, a valve type arrangement having a series of two-valve sealing surface, one for inlet purposes and one for outlet purposes. These are arranged in an annular type fashion around a spigot, these parts are assembled into a dispensing head device as a diaphragm being separate from the valve portion 12, the outlet portion 17 is also such that the substance contained in the container is open to the atmosphere once located inside outlet portion 3. In this way, the contents of the container can be contaminated if bacteria and other air-borne contaminants.

WO 86/04984

This invention relates to a self-sealing dispenser which will prevent the atmosphere from contaminating the contents of the container. However, this includes in one embodiment a separate valve portion with the diaphragm including a valve stem to seal an inlet. The valve stem is of a hollow nature and when the diaphragm is pushed the amount of travel available to the diaphragm is limited by the valve stem in its sealing arrangement with valve opening. Upon the release of the diaphragm the valve stem fills with the fluid contained in the container thus making it even more difficult to compress the diaphragm. Upon application of further pressure the contents contained inside the hollow valve stem are forced back into the main body of the container and are such that there is a great deal of movement with the fluid back into the chamber after it has exited same.

U.S. Pat. No. 4,457,454

This relates to a pump comprising a multiplicity of parts to form a valve arrangement which closes after the flexible diaphragm is compressed. Its operation and complexity is similar to that of WO 86/04984. This prior art device suffers from a multiplicity of parts and the need to encompass the flexible diaphragm with a shell for supporting the outlet valve. Further, the arrangement utilises a flexible bag which is located below the pump. The arrangement thus requires that a sufficient vacuum be produced to dispense the contents.

DE 3509178

This is a pump action type dispensing head utilising a pressure chamber which by means of the pump action simply draws fluid through and from the container portion out through a nozzle. However, no valve type arrangements are evident thus making the contents open to atmosphere and thus contamination.

EU 88109367.8

This is a device of a similar construction to DE 3509178 having very similar features and suffering from the same difficulties. It will be noted that no sealing arrangements are provided thereby opening the product to the atmosphere. In the case of both this and the previously mentioned prior art, an extremely large multiplicity of parts is required to produce the dispensing action.

SUMMARY OF THE INVENTION

It is an object of the present invention to provide a pressure dispensing pump which substantially overcomes or ameliorates at least one of the disadvantages of the prior art.

According to one aspect of the present invention, there is disclosed a pressure dispensing pump comprising a housing adapted to be attached to a fluent container said housing including an inlet port, said dispensing pump including a valve means for said inlet port and further comprising a pressure chamber portion which integrally includes an outlet port with valve means to close said outlet port.

According to another aspect of the present invention there is disclosed a pressure dispensing pump containing a pressure chamber portion which comprises a desplaceable wall portion terminating in a substantially planar pressure surface. Further the pressure chamber can be of an assymetrical configuration.

According to another aspect of the present invention, there is disclosed a pressure dispensing pump having an outlet port which is closed by means of a valve which opens under pressure generated by said dispensing pump characterised in that said valve is formed by a slit in said pressure chamber portion and said valve means performs its sealing function by the elastomeric nature of the pressure chamber portion.

The features of the invention allow a pressure dispensing pump to be produced which comprises a minimum number of parts and yet allow the pump to deliver a repeatable precise dose of the contents. The contents are delivered under pressure and the valve means of the pump excludes atmospheric contaminants.

The assymetrical shape of the pressure chamber portion ensures the rapid recovery of the head after dispensing. This ensures quick response and low activation pressure which is important in dispenser applications, e.g. electronic activation. Additionally this configuration maximises liquid flow adjacent to the valve and physically contributes to the operation of the valve. The open and closed condition of both inlet and outlet valves is assisted by the skin tension in the elastomeric material. Further a precise repeatable dosage can be achieved by controlling the travel of the pressure pad, of the dispensing chamber.

BRIEF DESCRIPTION OF DRAWINGS

Embodiments of the present invention will now be described with reference to the accompanying drawings in which.

DESCRIPTION OF EMBODIMENTS

Figure 1:
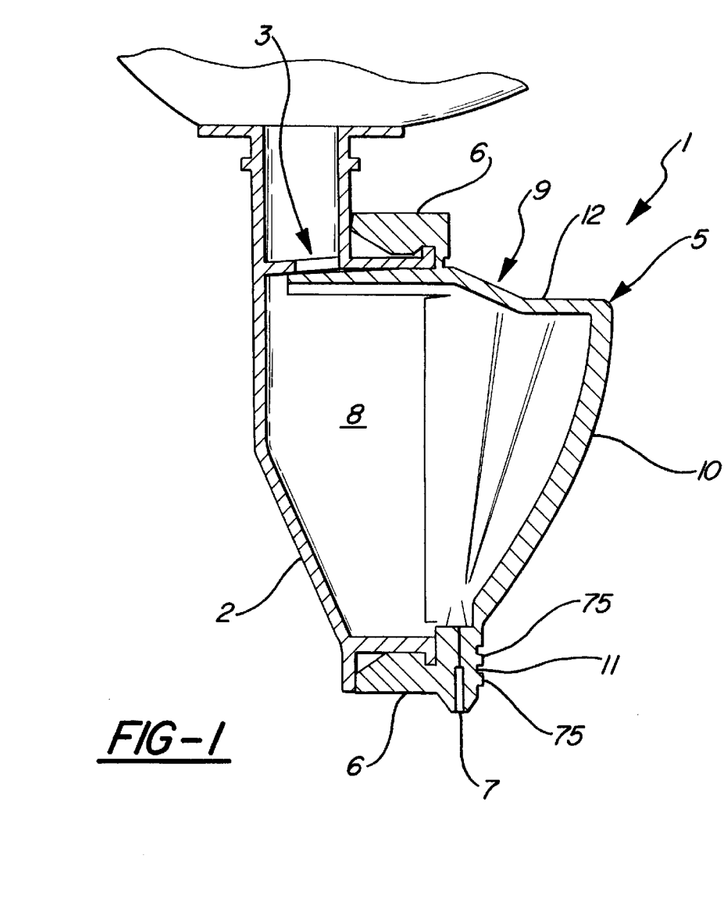
FIG. 1 illustrates a side sectional view of a first embodiment of the present invention.
Figure 2:
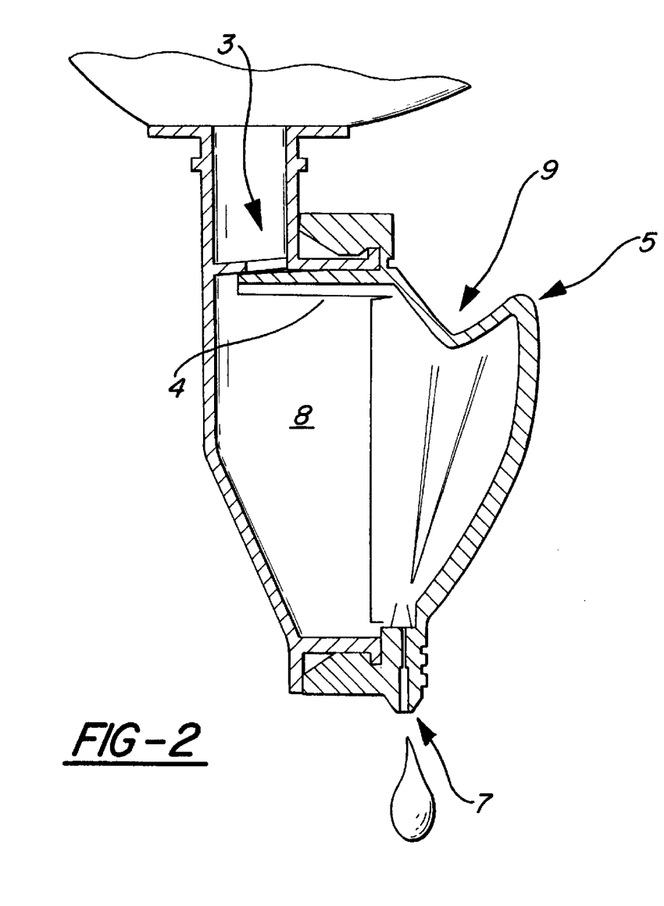
FIG. 2 illustrates the apparatus of FIG. 1 in use.
Figure 10:
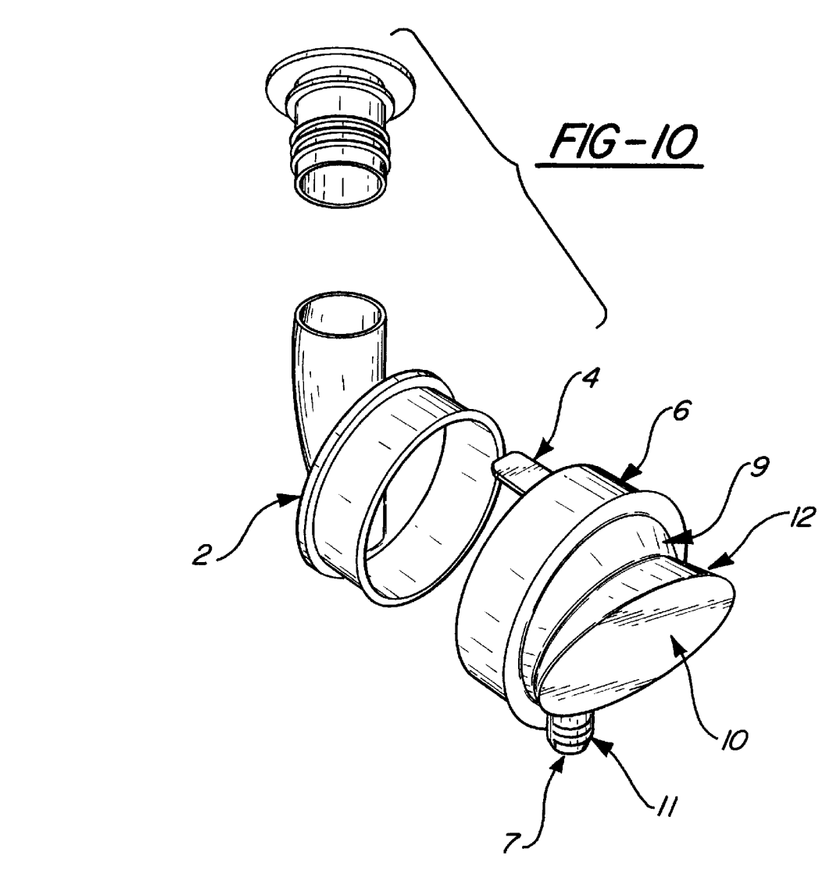
FIG. 10 Illustrates an exploded perspective view of the apparatus of FIGS. 1 and 2.

Illustrated in FIGS. 1, 2 and 10 the pressure dispensing pump 1 comprises walls forming a hollow housing 2 which includes an inlet port 3 and an inlet valve means 4, in the form of a reed valve. The housing includes a coupling C by means of which the housing may be connected to a vessel V constituting a source of dispensable material.

The reed type valve 4 is shaped to fit the housing 2 in the vicinity of inlet port 3 which is of a curved configuration. The valve 4 is integrally moulded with the pressure chamber portion. The reed valve 4 is shown closed against the port 3. The integrally moulded reed valve 4 allows contents of the vessel to pass through inlet port 3.

The housing of the dispensing pump 1 also includes a resiliently displaceable wall 5 which is circumferentially attached to the other walls of the housing 2 by means of flanges 6 to form a pressure chamber 8 . The pressure chamber 8 includes a delivery path comprising an outlet valve 7 which is in the form of pliable 'lips' 70 which can be formed by means of a slit at the juncture of the flange 6 and the wall 5. The outlet valve 7 also induces a delivery point or channel 25. The pressure chamber wall 5 is made of a plastics material of an elastomeric type such that the elastic or elastomeric nature of the plastics material forces the outlet valve 7 to be shut. In this way a very effective and inexpensive valve means is produced. The outlet valve 7 will open by means of a build up of pressure inside the dispensing chamber 8, which is above that necessary to overcome the elastomeric nature of the pressure chamber wall 5.

The pressure chamber wall 5 includes a collapsible hinge 9 which connects the wall 5 to the flanges 6. Also included is a pressure pad surface 10 which is connected at the base area 11 of the pressure chamber 8. Displacement of the wall 5 inwardly of the chamber will reduce its volume and dispense the contents. The base 11, in this instance, is in the vicinity of the outlet valve 7, and the collapsible hinge 9 is displaced inwardly of the chamber by deflection of the area 12. In this way, the portion wall 5 is given a degree of mechanical advantage when it is pushed in order to increase the pressure inside chamber 8. The surface 10 is of the same elastomeric material as the rest of pressure chamber wall 5, however it is of a thickness which is greater than that of the collapsible hinge 9. Upon increase of pressure in chamber 8, valve 4, is forced to shut and the build up of pressure in the chamber allows the outlet valve 7 to discharge the contents. When no further pressure can be or is applied by the pushing of the wall 5 the outlet valve 7 will close of its own accord, thereby preventing any air from making contact with the contents of chamber 8. Upon releasing of the wall portion 10, ball valve 4 opens allowing the contents of the container to re-fill chamber 8, still sealed from atmosphere.

Figure 9:
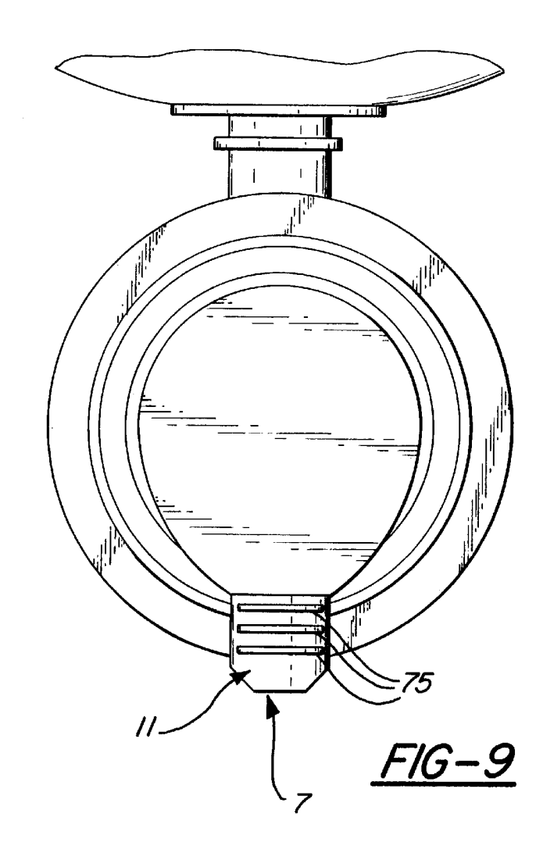
FIG. 9 illustrates a front view of the pressure chamber portion of the apparatus of each of FIGS. 1 to 8.

The pressure chamber wall 5 has a substantial assymetrical construction, a front view of which is illustrated in FIG. 9, and provides very simple yet easy operation by means of the portion 10. Also illustrated in FIG. 9 is a series of stiffening ribs 75 externally located on pressure chamber wall 5 in the vicinity of outlet valve 7. These ribs 75 provide added elastomeric strength to the pliable 'lips' 70.

The pressure dispensing pump 1 can be used in any orientation as it does not rely upon gravity for the opening or closing of valves, nor for the movement of fluid.

In discussing the rest of the figures, like portions to those of FIG. 1 are labelled with the same identifying number and only those portions which are different will be discussed.

Figure 3:
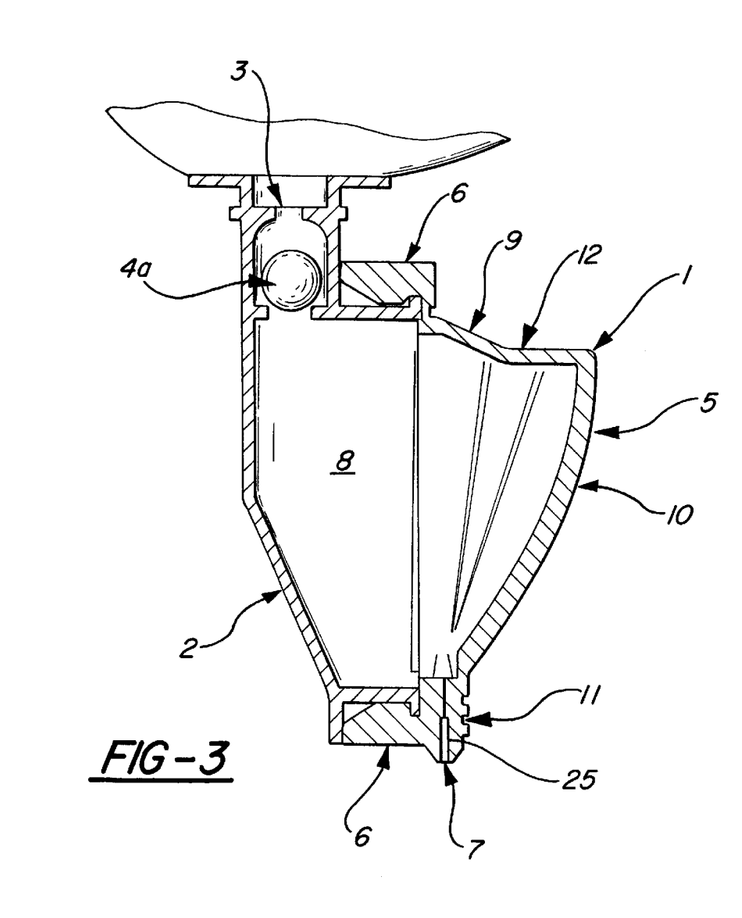
FIG. 3 illustrates a side sectional view of a second embodiment of the present invention.

In FIG. 3, the pressure dispensing pump is similar to FIG. 1, except that a ball valve 4A is provided. The ball check valve 4A is removably seatable in an irregular opening to allow contents to pass therethrough to refill the chamber 8.

Figure 4:
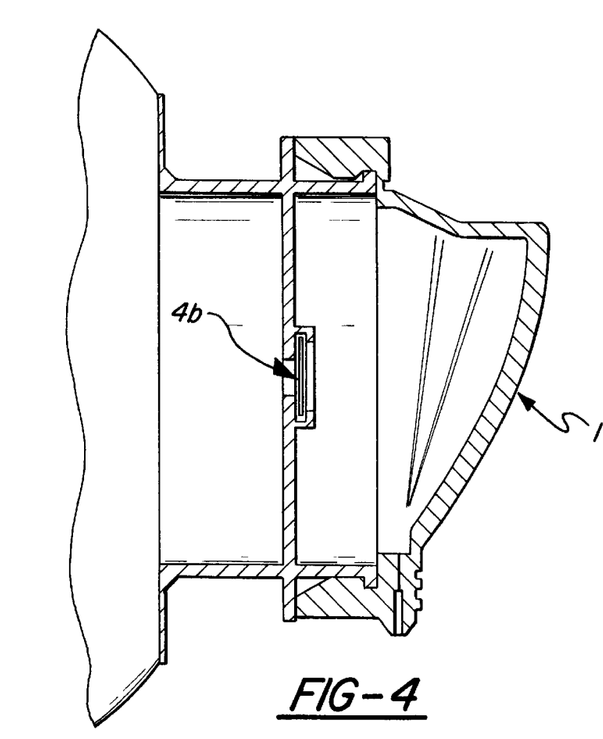
FIG. 4 illustrates a side sectional view of a third embodiment of the present invention.

In FIG. 4, the pressure dispensing pump 1 is similar in construction to that of FIG. 1. However, it includes a floating washer valve means 4B which operates in a very similar fashion to that of ball valve 4A. The valve 4B also is removably seatable in an irregular opening to allow contents to pass through the valve.

Figure 5:
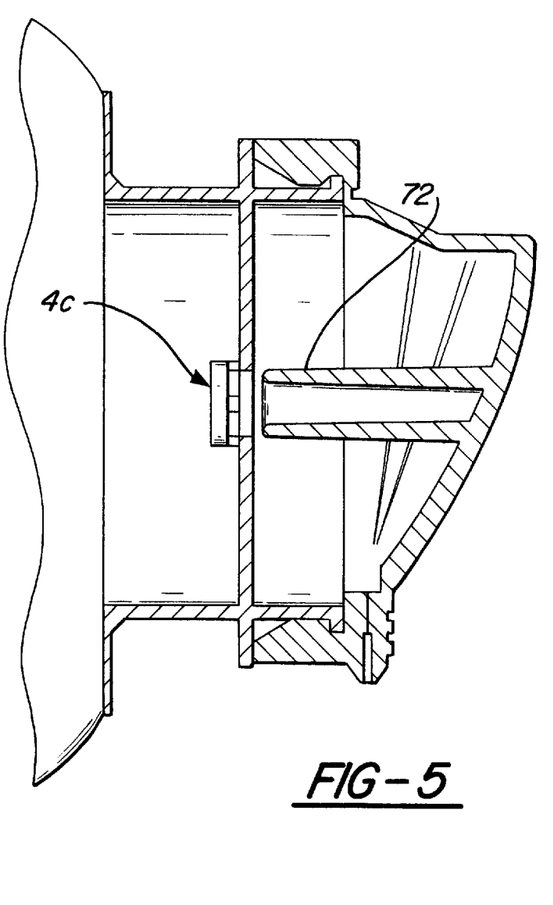
FIGS. 5 and 6 illustrates side sectional views of a fourth embodiment of the present invention.

FIG. 5 illustrates another embodiment of the invention, however the valve means is formed by means of a central column 72 which closes valve 4C.

Figure 6:
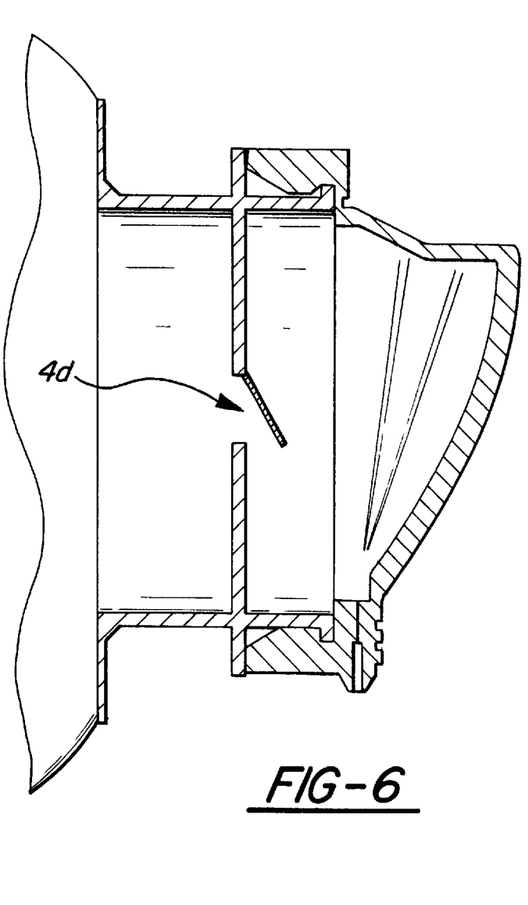

FIG. 6 illustrates a further embodiment of the present invention which utilises a flap valve 4D, with the flap valve being hinged to the housing of the dispenser.

Figure 7:
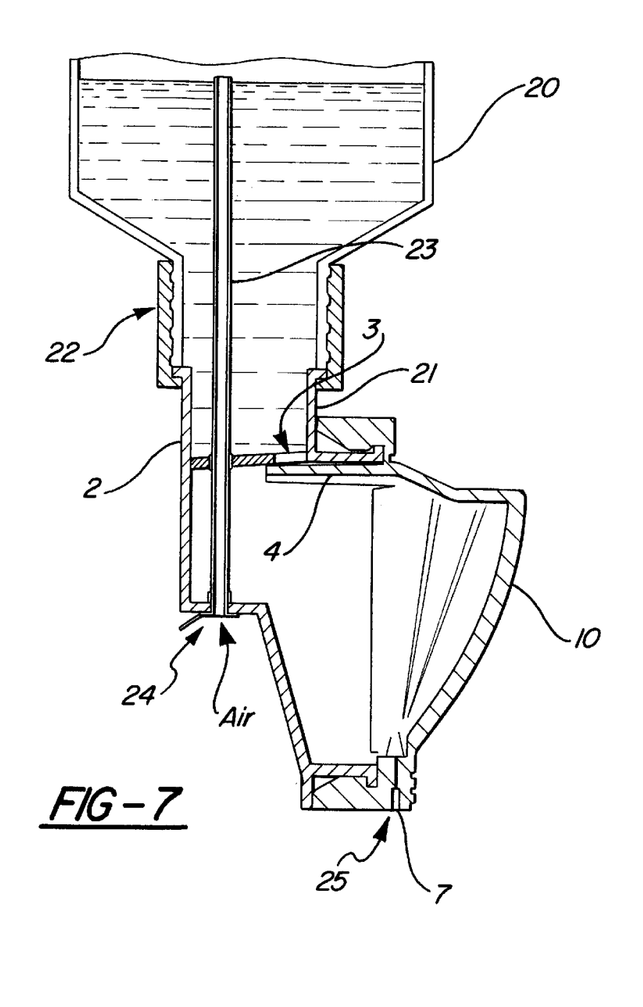
FIG. 7 illustrates a side sectional view of a fifth embodiment of the present invention.

Illustrated in FIG. 7 is a further embodiment which differs from FIGS. 1 to 6 in that the housing 2 is attached to a fluid supply reservoir 20 by means of a flanged coupling 21 and a threaded collar 22 which screws onto a mating thread on reservoir 20.

This embodiment also includes a breather tube 23 which is initially externally sealed by a tear off wall 24. Once the tear off wall 24 is removed the reservoir is vented allowing air to fill the void when the contents or liquid is dispensed.

The embodiment of FIG. 7 can be utilised in the downward position as illustrated.

Figure 8:
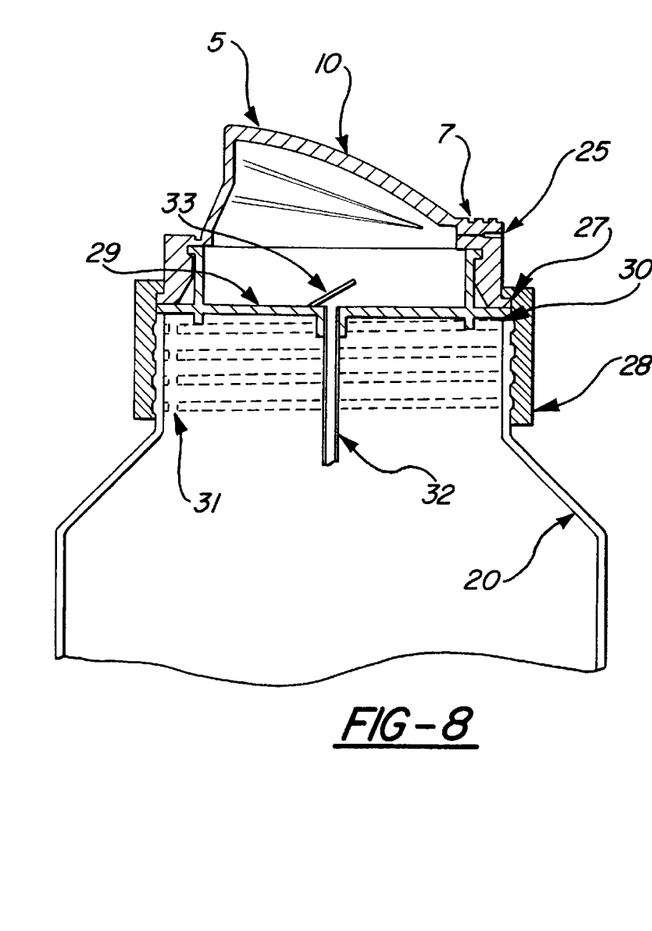
FIG. 8 illustrates a side sectional view of a sixth embodiment of the present invention.

Another embodiment illustrated in FIG. 8, is adapted to be utilised in a substantially upright position as illustrated. The pressure chamber wall 5 is secured to a reservoir by means of a coupling lip 27 on the wall 5, which engages a threaded collar 28. This seals the pressure chamber to an intermediate housing member 29. The tightening of threaded collar 28 forces the periphery of housing member 29 into contact with the extreme rim wall 30 of the top of the reservoir 20.

The mating threads between reservoir 20 and threaded collar 28, allow sufficient clearance for the ingress of air as fluid is dispersed. Channel portions 31 allow air into the reservoir 20 from beneath the housing member 29.

The housing member 29 includes a delivery tube 32 which delivers fluid from the bottom of the reservoir 20. A flap valve 33 hinged to housing member 29, closes off the delivery tube 32 in the same manner as flap 4 of previous embodiments.

Figure 11:
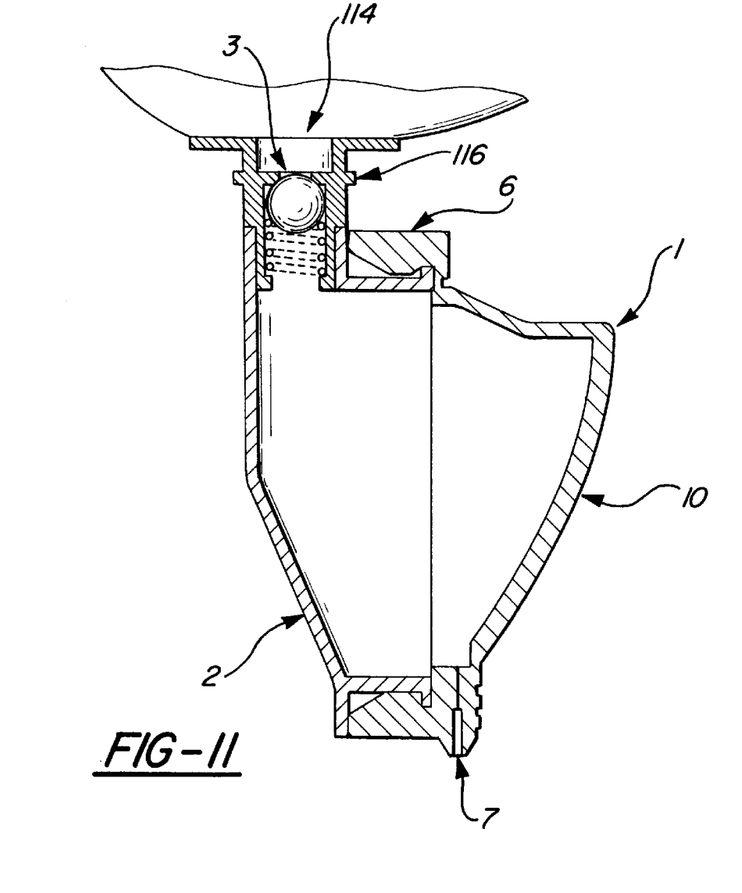
FIG. 11 illustrates a side sectional view of an embodiment similar to FIG. 1, however utilises a separate inlet valve means independent of the housing.

Illustrated in FIG. 11 is a further embodiment similar to that of FIG. 1, however this embodiment has a valve 114 in the form of a biased ball valve. The bias is achieved by spring 115 and acts to close off the inlet port 3, until such time as pressure in the housing 2 is reduced to such an extent that the pressure exerted on valve 114, by the reservoir contents is enough to overcome the force of spring 115.

The difference between this embodiment and that of FIG. 1, is that valve 114 is located in a fitting 116 rather than in housing 2, as in FIG. 3.

Figure 12:
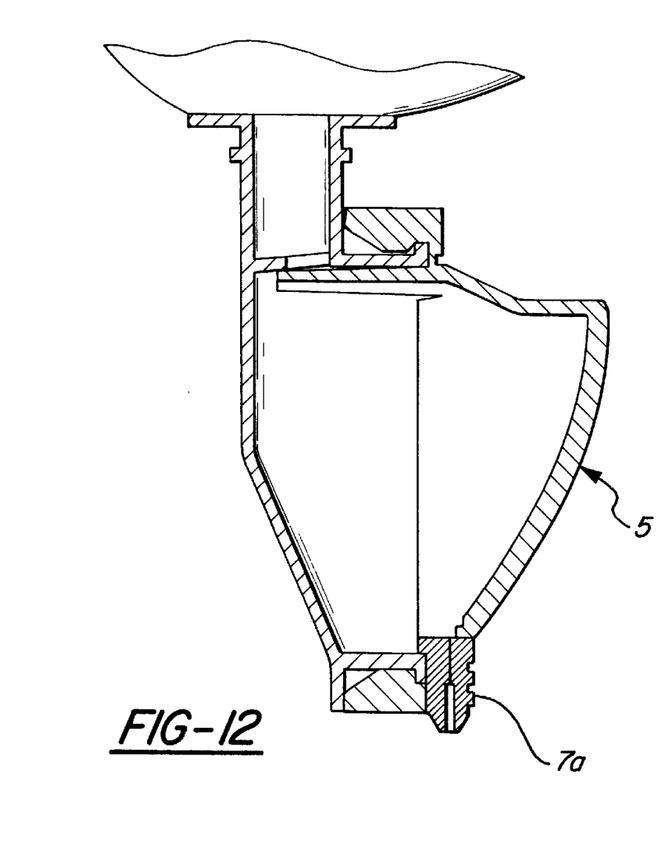
FIG. 12 illustrates a side sectional view of an embodiment utilising a separate outlet valve component.

Illustrated in FIG. 12 is an embodiment substantially similar to that of FIGS. 5, 6 and 10, except that a different outlet valve 7A is provided. This outlet valve 7A works in a similar manner to outlet valve 7 of all previous embodiments, except that it is not integral with pressure chamber wall 5 as in the other embodiments. This valve 7A can be secured to pressure chamber wall 5 by means of elastomeric pressure exerted by the material of pressure chamber wall 5, or same may be secured by adhesives, welding techniques or like joining processes.

Each of the pressure dispensing pumps described above can be specifically adapted by means of an air bleed system for utilising on rigid bottles or containers. These pressure dispensing pumps can be utilised on flexible containers having a variable volume such as collapsible bags, bladders tubes or rigid cylinders with a movable base without an air bleed system. A carefully metered dose can be delivered each time by the apparatus, when used in conjunction with a dispensing lever which has its length of travel controlled and provides a planar surface to rest next adjacent the portion 10 of the invention. In this way, the stroke of the pump can be controlled thus delivering a measured or desired quantity of liquid, gel, paste, or ever powder if of a flowable form.

Although the invention has been described above with reference to drawings and to preferred embodiments, it will be appreciated that the invention may be embodied in other forms or carried out in other ways without departing from the spirit or essential characteristics thereof. The above description is therefore to be considered as in all respects, illustrative and not restrictive, and all changes which come within the meaning and range of equivalency are intended to be embraced herein.

I claim:

1. A pressure responsive dispensing pump comprising a hollow housing having walls forming a chamber of predetermined volume; coupling means for connecting said housing to a supply of dispensable material; an inlet in communication with said chamber and said coupling means; inlet valve means for enabling the admission of a quantity of said material into said chamber via said inlet; an outlet in communication with said chamber; outlet valve means comprising an elastic member having a slit therein provided by a pair of communication with said chamber; outlet valve means comprising an elastic member having a slit therein provided by a pair of opposed lips self-biased into confronting sealed engagement with one another to form a seal between said chamber and said outlet and being movable away from one another in response to the application of pressure within said chamber for enabling the discharge of a quantity of said material from said chamber via said outlet, at least one of said walls being resiliently displaceable inwardly of said chamber for reducing the volume thereof and dispensing at least some of said material from said chamber via said outlet; and flexible, resilient hinge means connecting said one of said walls to said coupling means and being displaceable inwardly of said chamber to provide a mechanical advantage force on material in said chamber and in the direction of said outlet in response to displacement of said one wall inwardly of said chamber, whereby flexing of said hinge means assists in the dispensing of said quantity of material from said chamber.

2. A pump according to claim 1 wherein said outlet comprises a passage and said slit of said outlet valve communicates with said passage and said chamber.

3. A pump according to claim 2 wherein said slit extends through said one of said walls and wherein the material from which said one of said walls is formed has sufficient elasticity to maintain said slit closed in the absence of movement of said one of said walls inwardly of said chamber.

4. A pump according to claim 1 wherein said hinge means is formed of material having a thickness less than that of said one of said walls.

5. A pump according to claim 1 wherein said one of said walls includes stiffening ribs.

6. A pump according to claim 1 wherein said inlet valve means comprises a reed valve.

7. A pump according to claim 1 wherein said inlet valve means comprises a check valve.

8. A pressure responsive dispensing pump comprising a hollow housing having walls forming a chamber of predetermined volume; coupling means for connecting said housing to a supply of dispensable material; an inlet in communication with said chamber and said coupling means through which dispensable material may pass into said chamber; inlet valve means for enabling the admission of dispensable material from said supply into said chamber via said inlet; an outlet in communication with said chamber through which dispensable material may pass out of said chamber; and normally closed, self-sealing outlet valve means for enabling and disabling the discharge of dispensable material out of said chamber via said outlet, at least one of said walls of said housing being resiliently displaceable inwardly of said chamber a distance sufficient to reduce the volume of said chamber and generate sufficient pressure within said chamber to cause dispensable material within said chamber to open said outlet valve means and be discharged from said chamber via said outlet, said outlet valve means comprising an elastic member having a slit therein in communication with said chamber and said outlet, said slit having a pair of opposed lips self-biased into confronting engagement with one other to form a seal, said confronting lips being movable away from one another in response to the generation of said sufficient pressure, thereby providing a passage between said chamber and said outlet for the discharge of said dispensable material, said housing having a resilient, flexible hinge connecting said one of said walls to said coupling means, said hinge being movable inwardly of said chamber to provide a mechanical advantage force in the direction of said outlet in response to displacement of said one of said walls inwardly of said chamber, whereby said movement of said hinge also reduces the volume of said chamber and assists in the discharge of dispensable material from said chamber.

9. A pump according to claim 8 wherein said hinge is formed of material having a thickness less than that of said one of said walls.

10. A pump according to claim 8 wherein said outlet comprises an orifice terminating at one of its ends at said slit and being open to atmosphere at its opposite end.

\* \* \* \* \*